United States Patent

Asano et al.

Patent Number: 5,205,156
Date of Patent: Apr. 27, 1993

[54] DEVICE FOR DETECTION OF DEGREE OF CLOGGING OF A DUST FILTER

[75] Inventors: Hideo Asano, Gifu; Kenichi Fujiwara, Kariya; Toshihiro Takahara, Chiryu, all of Japan

[73] Assignee: Nippondenso Co., Ltd., Kariya, Japan

[21] Appl. No.: 792,605

[22] Filed: Nov. 15, 1991

[30] Foreign Application Priority Data

Nov. 16, 1990 [JP] Japan .................. 2-310918
Apr. 26, 1991 [JP] Japan .................. 3-122905
Sep. 20, 1991 [JP] Japan .................. 3-268615

[51] Int. Cl.$^5$ .............................. G01N 15/08
[52] U.S. Cl. ...................... 73/38; 340/607; 55/274
[58] Field of Search ............ 73/38, 40; 55/274, 283; 340/607

[56] References Cited

FOREIGN PATENT DOCUMENTS 56-121423 2/1980 Japan .
55-65119 10/1980 Japan .
56-64719 10/1981 Japan .

*Primary Examiner*—Hezron E. Williams
*Assistant Examiner*—Michael Brock
*Attorney, Agent, or Firm*—Cushman, Darby & Cushman

[57] ABSTRACT

A device for providing a signal warning of a clogging of a dust filter. A pair of air flow speed sensors A and B are arranged downstream of two sections of a dust filter 1 arranged in an air duct 1, and the outputs of the sensors A and B are connected to a comparator 6 having an output connected to a warning device 7. An obstacle 3 is arranged upstream or downstream of one section of the filter 1. When the filter is new, the speed of the air flow detected by the sensor B without an obstacle is higher than that detected by the sensor A located downstream of the obstacle, but the speed of clogging at the section without an obstacle is much higher than that at the section located downstream of the obstacle, and thus, after continuous use, the air speed detected by the sensor B becomes equal to that detected by the sensor A. The values of the detected speeds are compared to determine a degree of clogging of the filter, and to issue a warning signal when needed.

10 Claims, 13 Drawing Sheets

DEVICE FOR DETECTION OF DEGREE OF CLOGGING OF A DUST FILTER

BACKGROUND OF THE INVENTION

1. Field of the Invention

The present invention relates to a dust filter for trapping dust in air, and in particular, to a device for detecting a degree of clogging of the dust filter and producing a signal indicating same.

2. Description of the Related Art

Known in the prior art is a dust filter constructed by a rough mesh portion and fine mesh portion, a thermosensitive electric resistor arranged in each of these mesh portions, and a bridge circuit constructed by these thermo-sensitive resistors. The bridge circuit is connected, at terminals thereof to which a voltage is not supplied, to a warning device that provides a warning when a ratio of the values of the thermo-sensitive resistors is greater than a predetermined value. (See, Japanese Utility Model Publication No. 55-65119.) Namely, in this prior art, a special portion of a rough mesh is provided in a usual fine mesh portion of the dust filter, a value of an electric resistance at this rough mesh portion is obtained by measuring a velocity of a flow of air passing through the rough mesh portion, and a value of an electric resistance at the fine mesh portion is obtained by measuring a velocity of a flow of air passing through the fine mesh portion, whereby a ratio of the value of the measured electric resistance at the rough mesh portion to a value of the electric resistance at the fine mesh portion is calculated from the velocity of a flow of air passing through the rough and fine mesh portions.

This prior art suffers from a drawback that, to detect a degree of clogging of the filter, a dust filter having a special design, i.e., in addition to a usual fine mesh portion, a rough mesh portion must be provided in the dust filter, must be used. Accordingly, there is a demand for an improved device capable of detecting a degree of clogging of a dust filter having a normal design.

SUMMARY OF THE INVENTION

An object of the present invention is to provide a device for precisely detecting a degree of clogging of a dust filter, the dust filter being a normal type having a uniform fine mesh over the entire surface thereof.

According to the present invention, a device is provided for detecting a degree of clogging due to an accumulation of dust in a filter for capturing dust in a flow of air in an air passageway, the device comprising:

at least one pair of sensors arranged in the air passageway at parts of the air flow corresponding to different sections of the dust filter, respectively, the sensors outputting electric signals indicating the air flow speed at the respective parts of the air flow;

means for detecting a difference in a speed of an air flow introduced into the dust filter, at the parts of the air flow;

a comparator for comparing levels of signals output from the sensors arranged at the respective parts of the air flow; and means for outputting a signal indicating that a degree of clogging has occurred in the dust filter when a predetermined relationship is established between the signals output from the sensors.

According to the present invention, the flow speed sensors are provided at parts of the air flow corresponding to at least two sections of the dust filter, respectively, a means is provided for differentiating the speed of the parts of the air flow introduced into the respective sections of the dust filter, and the air flow speed sensors detect and compare the speeds of the air flow passing through the respective sections of the dust filter. The speeds of the air flow at the different sections of the air flow causes the amount of air per unit of time passing through the dust filter to be different at the two sections thereof, and due to the difference in the amount of the air at these two sections, the amount of dust in the air captured by the dust filter is different at the two sections. Namely, the amount of dust captured at the first section of the filter through which the air flow part having a low air speed passes is smaller than the amount of dust captured at the second section of the filter through which the air flow part having a high air speed passes. Namely, the rate of clogging in the second high air speed section is faster than that in the first low air speed section. When the dust filter is new, the speed detected by the air flow speed sensor in the high speed air flow part at the second section of the dust filter is higher than the speed detected by the air flow speed sensor in the low speed air flow part at the first section of the dust filter. Nevertheless, as a result of a consecutive use of the dust filter, the rate of clogging of the second section of the filter through which the high speed part of the air flow passes is much faster than that at the first section of the filter through which the low speed part of the air flow passes. As a result, the air speed of the flow corresponding to the second section of the filter suffers a very sharp drop. Contrary to this, at the first section of the filter, to which a low speed air flow is introduced, the rate of the clogging of the filter is slow, and thus the air speed detected by the sensor arranged in the first part of the air flow remains substantially unchanged during use. As a result, after a prolonged use, the value of the air flow speed detected by the sensor arranged in the portion corresponding to the second section of the air filter becomes larger than the value of the air flow speed detected by the sensor arranged in the portion corresponding to the first section of the air filter. Namely, an equal value of the air flow speed detected by both of the sensors means that the values of the air flow resistance are equal at both sections. The locations of the sensors and/or shape and/or dimension of the obstacle for obtaining different air flow parts having different air speeds to be introduced to different sections of the air filter are determined such that the values of the air flow resistance detected by both sensors, when equal, are equal to a threshold value of the air flow resistance for determining a replacement of the filter. As a result, a signal indicating a timing for a replacement of the filter can be obtained when an output level from a comparator comparing the signal level from both sensors becomes equal to a predetermined output, for example, a logic signal "1", indicating that the signal levels from both sensors are equal or are at adjacent values.

According to the present invention, the sensors for detecting the air flow are arranged in parts of the air flow which pass through at least two sections of the filter having a same degree of fineness, and thus it is not necessary to provide portions having a different fineness in the present invention, as in the prior art. Accordingly, the present invention can obviate the difficulty in the prior art of using sections having a different fineness in one and the same dust filter, i.e., it is difficult to obtain a desired difference in the degree of fineness of two sections, and thus the sensitivity is unstable.

DESCRIPTION OF THE PREFERRED EMBODIMENTS

Figure 1:
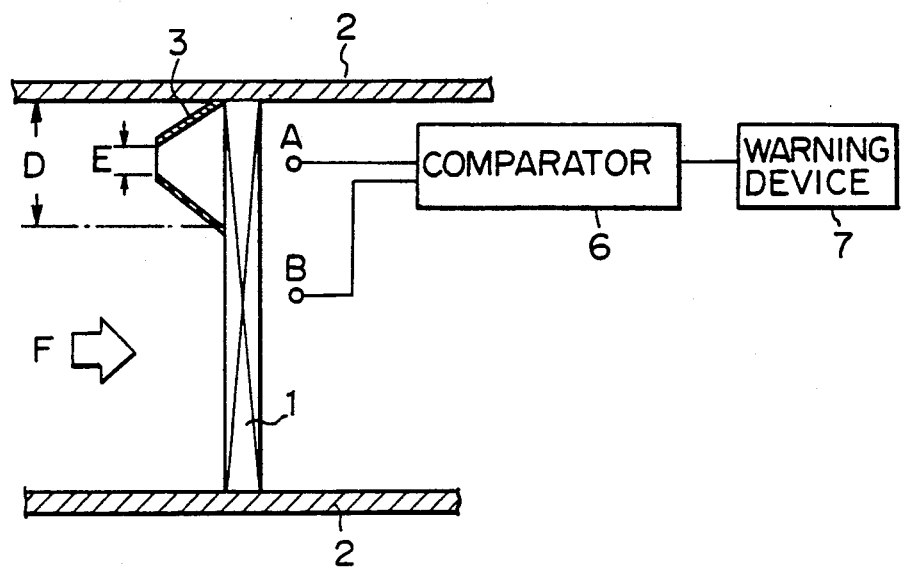
FIG. 1 is a view of a first embodiment of the present invention.

In FIG. 1, reference numeral 1 denotes a dust filter arranged in an air duct 2 in which air flows in a direction shown by an arrow F. Upstream of the dust filter 1, an obstacle 3 to the flow of air is fixed to the duct 2 at a portion of the dust filter 1 inside the duct 2. The function of this obstacle 3 is to change the speed of the flow of air in the duct 2 at different sections of the filter 1. The obstacle 3 is constructed by a sheet made of, for example, metal, formed into a truncated cone shape having a small opening with a diameter E and a larger opening with a diameter D, and having a central axis transverse to the general plane of the dust filter 1; the larger opening facing and in contact with the dust filter 1.

Assuming that an air flow having a flow amount $V_0$ and flow velocity F is introduced into the air duct 2 in the direction of an arrow F. In this case, the narrow air flow introduced to the inside of the obstacle 3 at the small opening having a diameter E is widened when the air flow is introduced to and passed through the dust filter 1 at a first section (one area) in contact with the obstacle 3 at the large opening having the diameter D thereof. The speed of the widened flow of the air at the first section of the dust filter 1, therefore, is slower than the speed of the normal air flow introduced into the other area of the dust filter 1 not covered by the obstacle 3.

As shown in FIG. 1, a first air flow speed sensor A is arranged inside the air duct 2 at a position downstream of the dust filter 1 at the first section (one area) having the diameter D covered by the obstacle 3, and a second air flow speed sensor B is arranged at a position downstream of the dust filter at the second section (the other area) not covered by the obstacle 3. Assuming that the dust filter 1 is new, an air flow speed fa detected by the first air flow speed sensor A, and an air flow speed fb detected by the first and the second air flow speed sensors A and B, respectively, are obtained by the following equations, $$fa \simeq V_0 \times E^2/D^2, \; fb \simeq V_0,$$

where the value of D is larger than that of E (D>E).

The above equation shows that the air flow speed fb must be larger than fa. Therefore, when a ratio of the amount of dust in the air amount $V_0$ is $\gamma$, the amount Ma of dust per unit time attached to the first section (one area) of the dust filter 1 having the diameter D downstream of the obstacle 3 (upstream of the first sensor A), and the amount Mb of dust per unit time attached to the second section (the other area) of the dust filter 1 upstream of the second sensor B are expressed, respectively, by the following equations.

$$Ma \simeq \gamma V_0 \times E^2/D^2, \; Mb \simeq \gamma V_0,$$

where D>E. When the amounts of dust attached per unit time Ma and Mb are compared, the former is smaller than the latter (Mb>Ma), and thus the speed fb detected by the second air flow speed sensor B drops much more rapidly than the speed of the air flow detected by the first sensor A. This means that, with respect to the value of the air flow speed fa detected by the second sensor A corresponding to the section of the filter 1 downstream of the obstacle 3, the value of the air flow speed fb detected by the second sensor B corresponding to the area other than the area where the obstacle 3 is provided becomes much smaller when a certain time has elapsed after the commencement of use of the new filter 1.

As shown in FIG. 1, a comparator 6 has two inputs connected to the outputs of the first and second sensors A and B, respectively, and an output connected to a warning device 7, which issues a warning signal when it is determined that the output signals from the speed sensors A and B are at the same level.

Figure 2:
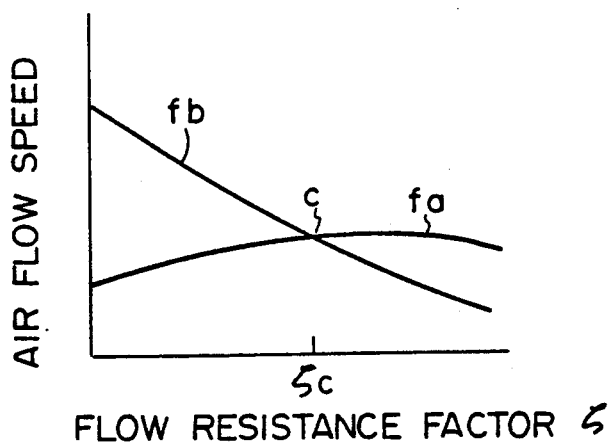
FIG. 2 shows curves of air flow speeds detected by two sensors versus a flow resistance factor of the filter.

FIG. 2 shows how the wind speeds fa and fb detected by the wind speed sensors A and B change in accordance with the flow resistance factor $\zeta (\simeq 2 \times \Delta p/\rho V^2)$ of the filter 1, wherein $\Delta p$ is a pressure loss across the filter 1, ρ is a density of the air, and V is an amount of air flow. It is found from FIG. 2 that, at the location downstream of the first section of the dust filter 1 of the diameter D corresponding to the obstacle 3, there is no substantial change in the air flow speed fa, regardless of an increase in the filter flow resistance ζ as a result of a clogging of the dust filter 1. Contrary to this, the air flow speed fb at the second section corresponding to the section of the dust filter 1 other than that provided with the obstacle 3 is substantially linearly decreased in accordance with the increase in the filter flow resistance ζ as a result of the clogging of the dust filter 1. At a particular value of the flow resistance ζc (point C in FIG. 2), the value fa is equal to the value fb, and the value of the air flow fb then decreases further as the filter flow resistance ζ increases. If a particular threshold value ζc of the filter flow resistance ζ at which the used dust filter 1 should be replaced is suitably selected in accordance with the construction, ability, and purpose of the filter 1, and if dimensions D and E of the obstacle 3, which correspond to the characteristic of the curve of fa in contact with the curve at the point ζc, are also suitably selected, the warning signal from the warning device 7 can be timely issued when the degree of the clogging of the dust filter 1 conforms to a predetermined threshold value at which the filter 1 should be replaced. In the embodiment of the obstacle 3 as a taper-shaped tube as shown in FIG. 1, a particular value ζc of the filter flow resistance factor can be obtained by changing the ratio of the inner diameter D of the large opening to the inner diameter E of the small opening.

Figure 3:
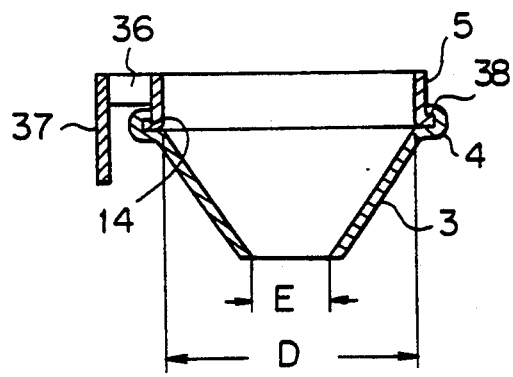
FIG. 3 shows an obstacle and mounting thereof in an embodiment of the invention.
Figure 4:
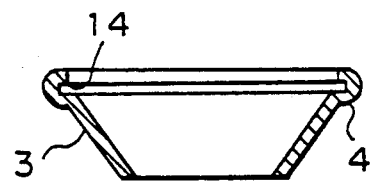
FIGS. 4 and 5 show modifications, respectively, of an obstacle used in place of that used in FIG. 3.
Figure 5:
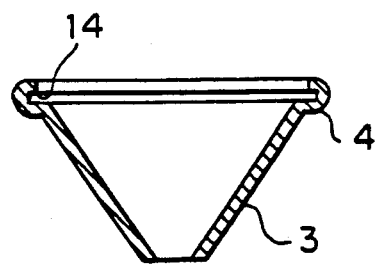

FIGS. 3 to 5 show embodiments whereby the threshold value ζc of the filter flow resistance factor can be changed. In FIG. 3, the obstacle 3 in the shape of a truncated cone forms an integral flange portion 4 having a substantially U or semicircular cross section, which opens inward. A tube-shaped mount 5 having an inner diameter D is inserted to the flange portion 4 of the obstacle 3, and is arranged on the front side of the dust filter 1, as in FIG. 1. The mount 5 is connected, via a support member 36, to a mount base 37 fixed to the inner side of the duct 2, as in to FIG. 1. The front end of the tubular shaped mount 5 is provided with a radially extending annular projection 38 fitted inward of the annular groove formed by the flange portion 4 of the obstacle 3, and as a result, an easy detachable connection of the obstacle 3 to the duct 2 via the members 36 and 37 is realized.

FIGS. 4 and 5, respectively, show modifications of the obstacle 3 having the same inner diameter D as that of FIG. 3, but wherein the inner diameters E are changed, respectively. In place of the obstacle 3 in FIG. 3, the obstacle 3 shown in FIG. 4 or 5 is mounted by the mount 5 so that the target value of ζc is changed when the filter 1 is replaced.

Figure 6:
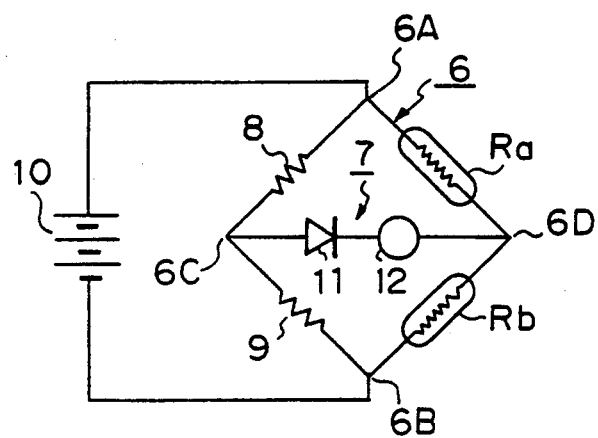
FIG. 6 is a view of a comparator and warming device according to the present invention.

FIG. 6 shows wind speed sensors A and B, which are equivalent to the thermo-sensitive electric resistors Ra and Rb, respectively, connected to electric resistors 8 and 9 to thereby construct a comparator 6. The thermo-sensitive resistors Ra and Rb, and the resistors 8 and 9 form a bridge circuit having a first pair of diagonal points (terminals) 6A and 6B connected to a battery 10, and a second pair of diagonal points (terminals) 6C and 6D connected to a warning device 7 constructed by a Zener diode 11 and a light generating diode 12 connected in series.

Figure 7:
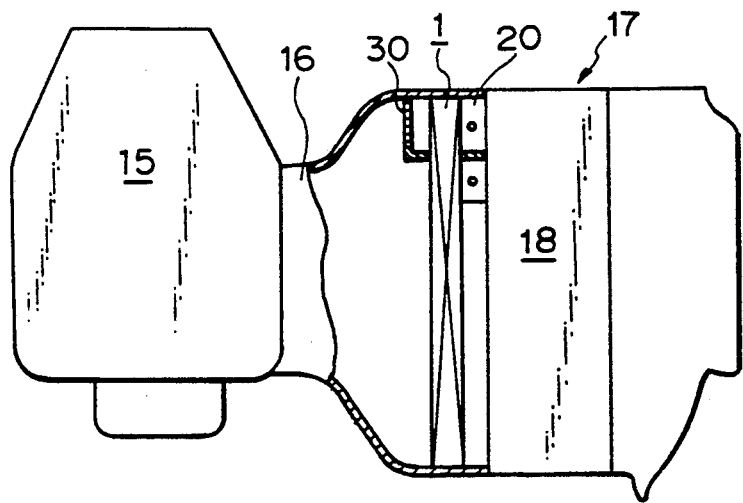
FIG. 7 is partial view of an air conditioning device for an automobile, in which a dust filter according to the present invention is employed.
Figure 8:
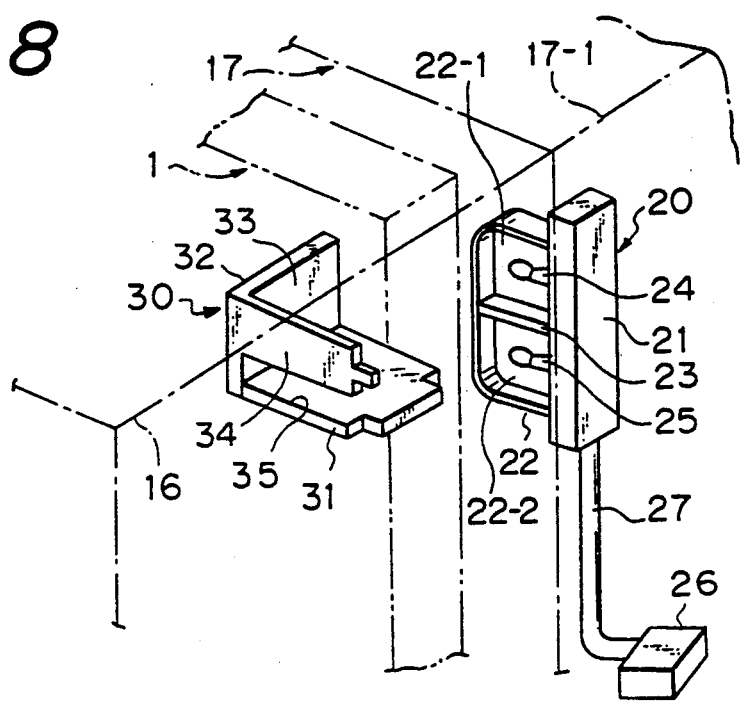
FIG. 8 is a partial and perspective view of an obstacle and detecting unit shown in FIG. 7.

FIGS. 7 and 8 show another embodiment of the present invention, wherein the present invention is as a device for warning of a detection of a clogging of a dust filter in an air conditioner for an automobile. In FIG. 7, reference numeral 15 denotes a blower unit for an air conditioner for an automobile. An air duct 16 is arranged downstream of the blower unit 15, in the direction of an air flow from the blower unit 15, and is provided with a cooler unit 17 having an evaporator 18 for obtaining an air cooling operation for air conditioning when a cooling medium is evaporated. The dust filter 1 according to the present invention is arranged inside the air duct 16 at an end thereof adjacent to the cooler unit 17, an obstacle 30 is arranged on the upstream side of the dust filter 1 along a partial section thereof, and a detection unit 20 is arranged between the dust filter 1 and the evaporator 18 of the cooler unit 17.

In FIG. 8, the detection unit 20 has a rectangular shaped base 21 on which a U-shaped flow-shaping plate 22 formed from a sheet made of, for example, metal, is mounted, so that a U-shaped space is formed between the base plate 21 and the flow-shaping plate 22. A partition 23 is arranged inside the space, to thereby divide it into two parts in which air flow speed sensors 24 and 25 are arranged, respectively. Reference numeral 26 denotes a warning unit housing a comparator 6 and a warning apparatus 7. The warning unit 26 is located at a suitable position in a automobile, e.g., near the driver's seat (not shown), via a connection line 27. The base plate 21 is inserted to an outer wall structure 17-1 of the cooler unit 17 via an opening (not shown) formed in the wall structure 17-1, and is firmly connected to the cooler unit 17 in such a manner that the flow shaping plate 22, the partition wall 23, and the flow speed sensors 24 and 25 face a downstream side of the dust filter 1.

An obstacle 30 is located at the downstream end of an air duct 16. In this embodiment, the obstacle 30 is constructed from a separating plate 31 made of a flat sheet of, for example, metal, and fitted to an opening (not shown) formed in the air duct 16, and from a flow resisting member 32. The separation plate 31, which is located upstream of the dust filter 1 as shown by a phantom line, is connected to the air duct 16 so that the plate 31 is located on the same plane as that of the partition plate 23 of the detecting unit 20. The flow resistant member 32 is formed into an L-shape having a separation plate 33 extending longitudinally toward the filter 1, the plate 33 being connected to a free end of the separation plate 31, and a flow resistant plate 34 having a width smaller than that of the separation plate 33, the free end of the plate 34 being fitted to a mounting opening (not shown) formed in the air duct 16. The flow resistant plate 34 is located upstream of one of the sensors 24 and 25 of the detecting unit 20, preferably the sensor 24 located at a corner of the dust filter 1, so that a narrow opening 35 is formed between the flow resistant plate 34 and the separation plate 31, by which the amount of air flowing to a section 22-1 formed between the flow shaping plate 22 and the partition plate 23 for accommodating the sensor 24 is made less than the amount of air flowing to a section 22-2 for accommodating the sensor 25.

According to the embodiment shown in FIGS. 7 and 8, air from the blower unit 15 is introduced via the air duct 16 into the dust filter 1, for removing dust therein, and then directed to the evaporator 18 of the cooler unit 17. Accordingly, because the partition plate 33 of the obstacle 30, which is located upstream of the dust filter 1, is located on the same plane as that of the partition plate 23 of the detection unit 20 downstream of the dust filter 1, at the two sections 22-1 and 22-2 formed by the flow shaping plate 22 and the partition plate 23 of the detection unit 20, a flow of air throttled by the opening 35 formed between the flow resistant plate 34 and the separation plate 33 of the obstacle is obtained only at the section 22-1 accommodating the flow speed sensor 24, and such a throttled flow of air is not obtained at the section 22-2 accommodating the flow speed sensor 25. As a result, as in the first embodiment shown in FIG. 1, it is possible to detect a clogging of a dust filter, and a warning signal can be issued, on the same principle as that applied by the comparator 6 and warning device 7 shown in FIG. 2.

Figure 9:
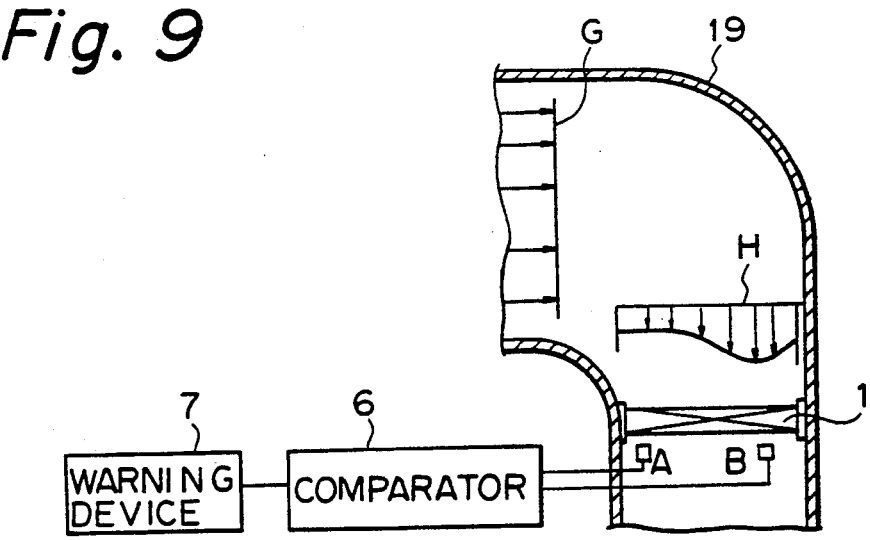
FIG. 9 shows another embodiment of the invention in which a speed differential of the air flow at a dust filter is obtained by a curved duct.

FIG. 9 shows another embodiment of the present invention. In this embodiment, the air duct 19 change the direction of the flow of air therein by 90 degrees, from the upstream end thereof to the dust filter 1 located at the downstream end thereof. In this type of the air duct 19, even if the flow pattern at the upstream end of the duct 19 is a uniform flow having a constant speed, as shown by the air flow diagram G, when the flow pattern is subjected to the change of direction of the flow of 90 degrees, it becomes non-uniform as shown by the air flow diagram H, because a centrifugal force and frictional force applied to the air flow are locally changed. Namely, sections having different air flow speeds, as shown by the diagram H, are created on the surface of the dust filter 1. According to this embodiment, a first sensor A is arranged downstream of the section of the dust filter subjected to the lowest air flow speed, and a second sensor B is arranged downstream of the section of the dust filter subjected to the highest air flow speed. Furthermore, the comparator 6 and warning device 7 are provided as shown in FIG. 1, whereby a clogging of the dust filter 1 is detected, and a warning issued, from changes in the values of the air flow speeds detected by the sensors A and B.

Figure 10:
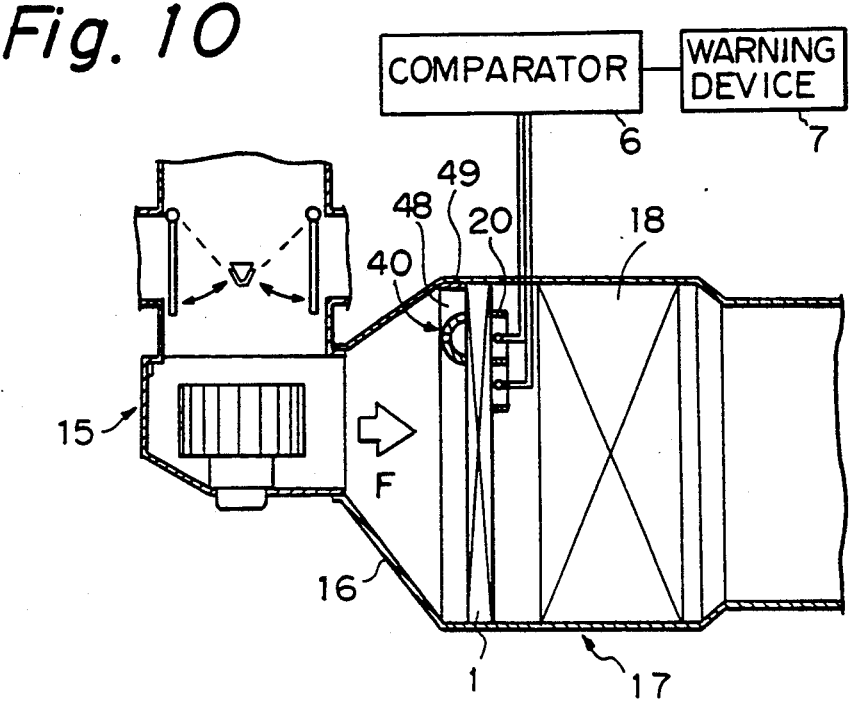
FIG. 10 is similar to FIG. 7, but shows another embodiment of the invention.
Figure 11:
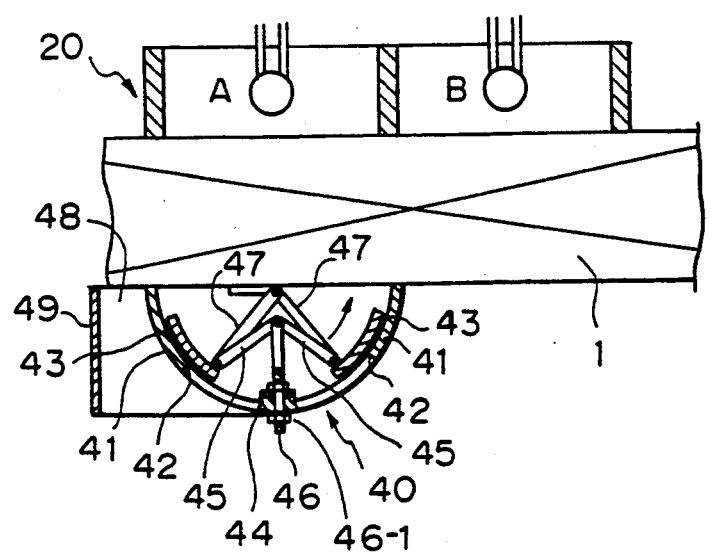
FIG. 11 is an enlarged view of a part shown in FIG. 10.

FIGS. 10 and 11 show an embodiment wherein an obstacle 40 having a variable air flow resistance is arranged upstream of the sensor A in the detecting unit 20, on the opposite side of the dust filter 1. The obstacle 40 located upstream of the sensor A in the detecting unit 20, on the other side of the filter 1, is formed substantially as a semi-cylindrical flow resistant body 41 having an opening 42 at the center of the length and width of the semi-cylindrical body 41. A pair of movable plates 43 formed as a part of a cylinder concentric to the body 41 are arranged on the inner or outer surface of the body 41 in such a manner that the plates 43 slide on the body 41 about the center of the cylinder, to thereby control the degree of opening of the opening 42. A pair of first supporting arms 45 are provided, one ends of which are pivotally connected to the respective movable plates 43 and the other ends are connected to an end of a sliding rod 46 slidable with respect to the basic pillar portion 44 along the diametric direction of the body 41. The pillar portion 44 is located at the center of the opening 42 so as to be slightly extended along the axial direction, and a pair of axially spaced apart nuts 46-1 are screwed to the rod so as to be astride the body 41. A pair of second supporting arms 47 are provided, one ends of which are pivotally connected to the respective movable plates 43 and the other ends are fixed at the axial center of the cylindrical body 41. The flow resistant body 41 is connected to the inner wall of the air duct 16 through a mounting base 49 connected to the separate plate 48.

According to this embodiment, a loosening of the nuts 46-1 screwed to the sliding rod 46 allows the rod 46 to be freed from the pillar portion 44, whereby the sliding rod 46 can be slid with respect to the pillar portion 44 in a diametrical direction of the semi-cylindrical flow resistant body 41. This sliding movement 46 of the rod 46 causes the first arms 45 to be pivoted, permitting the movable plates 43 to slide on the cylindrical surface of the body 41 and thereby increase or decrease the effective flow area of the opening 42. The second arms 47 provide a stable movement of the movable plates 43 along the cylindrical inner surface of the body 41. When a desired dimension of the effective opening of the hole 42 is obtained, the nuts 46-1 are tightened to fix the rod 46 to the support portion 46. As will be understood from the above description, the embodiment in FIGS. 10 and 11 makes it possible to obtain a variable control of the amount of air introduced to the section of the filter 1 located downstream of the obstacle 40, and as a result, a value of the air flow resistance factor $\zeta$ due to clogging at the section downstream of the obstacle 40 can be suitably adjusted.

Figure 12:
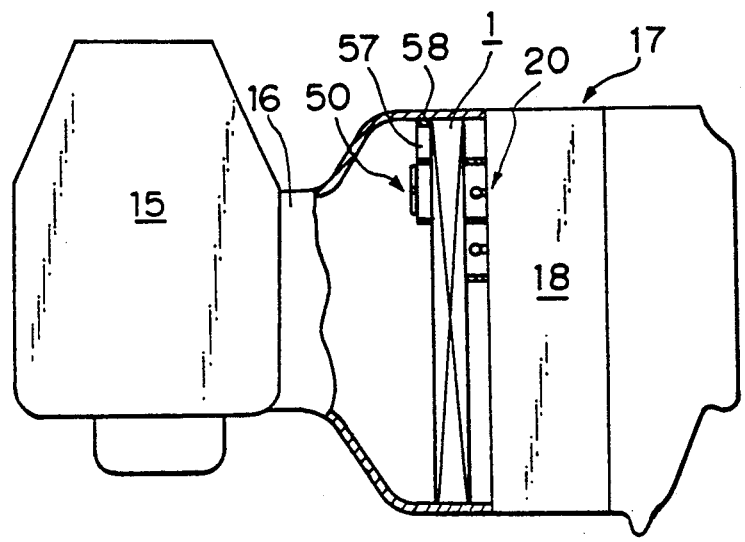
FIG. 12 is similar to FIG. 7, but shows still another embodiment of the invention.
Figure 13:
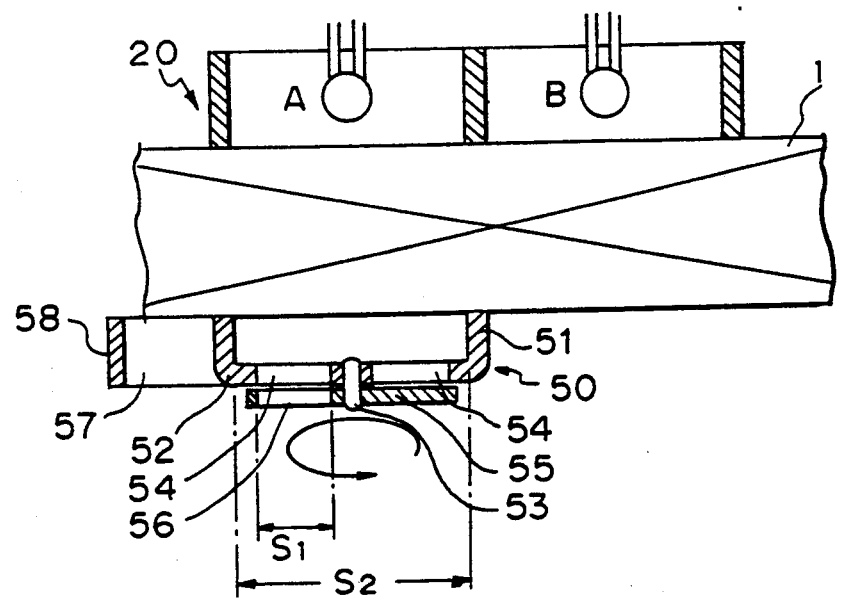
FIG. 13 is an enlarged view of a part shown in FIG. 12.
Figure 14:
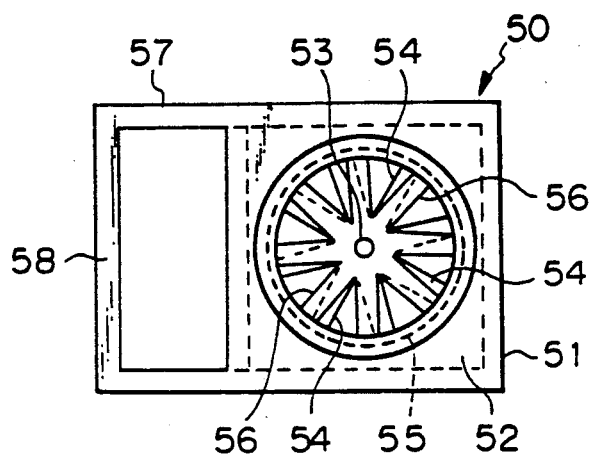
FIG. 14 shows a front view of the obstacle shown in FIG. 13.

FIGS. 12 to 14 show another embodiment of the invention wherein a variable flow resistance type obstacle 50 different to that shown in FIGS. 10 and 11 is arranged upstream of the first sensor A. The obstacle 50 is provided with a flow resistant body 51 having a rectangular cross-section and having a bottom plate 52 provided with a plurality of openings 54 (FIG. 14) circumferentially spaced about the center of the bottom plate 52. A shaft 53 at the center portion of the bottom plate 52 connects a rotating plate 55 rotatably to the body 51. A plurality of circumferentially spaced openings 56 are formed in the rotating plate 52 at positions corresponding to those of the openings 54 in the bottom plate 52. Namely, as shown in FIG. 14, the openings 54 in the plate 52 and the openings 56 in the plate 55, each having the same diameter, are located at the same radial positions, and have the same circumferential spacing. The rectangular body 51 has a pair of opposite side walls 57 extending to a support plate 58 and connected to the inner wall of the air duct 16, to thus attach the obstacle 50 thereto.

According to the embodiment shown in FIGS. 12 to 14, when the rotary plate 55 is situated so as to align the openings 54 in the plate 52 and the openings 56 in the plate 55, the maximum amount of air flows to the section of the dust filter 1 located upstream of the sensor A. A rotation of the plate 55 by the shaft 53 misaligns the openings 54 and 56, and thus the amount of air flowing the section of the dust filter 1 upstream of the sensor A is reduced. Namely, an angular position of the rotary plate 55 with respect to the stationary plate 52 is controlled to obtain a desired flow resistance factor $\zeta$ caused by clogging of the dust filter 1.

Figure 15:
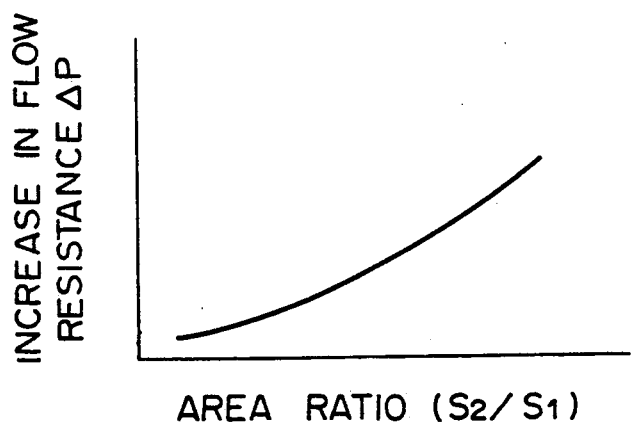
FIG. 15 shows a relationship between a ratio of a total area to an effective area, and an increase in a flow resistance.

Throughout the embodiments as previously explained, S2 is an inner effective area of the obstacle 3, 30, 40 or 50 opened to the dust filter 1 at the end thereof in contact with the filter 1 (this area is equal to $\pi D^2/4$ in the embodiment in FIGS. 3 to 5), and S1 is an inner effective area of the dust filter at the opposite end opened to the duct 16, i.e., the area of the opening 42 or 53 not covered by the movable plate 43 or 55 (the latter area is equal to $\pi E^2/4$ in the embodiment in FIGS. 3 to 5). FIG. 15 shows the relationship between a ratio of the area S2 (total flow area) to the area S1 (effective flow area) and an increase in the flow resistance $\Delta P$. As will be seen from FIG. 15, the flow resistance $\Delta P$ can be controlled in accordance with the effective flow area S1. Namely, the variable flow resistance type obstacle 40 or 50 makes its possible to adjust the apparatus so that it corresponds to the characteristic of the air conditioner to which the device is to be mounted, whereby a desired detection of the degree of clogging of the filter can be obtained.

Figure 16:
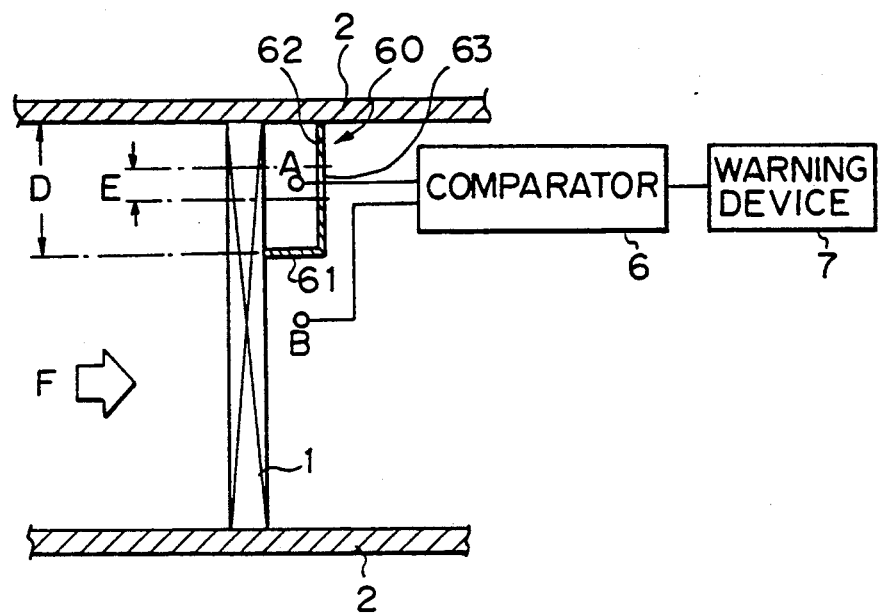
FIG. 16 is a view of another embodiment of the invention.

In the above-mentioned first group of embodiments, the obstacles 3, 30, 40 and 50 are arranged upstream of the detecting unit 20 via the dust filter 1, but in the second group of embodiments, as described later, an obstacle 60 of this embodiment is arranged downstream of a detecting unit FIGS. 16 and 17 correspond to the embodiment shown in FIG. 1, of the first group, wherein an obstacle 60 is made from a plate of, for example, metal, which obstacle 60 is composed of a separation plate 61 extending downward and vertically with respect to the plane of the dust filter 1 and a flow resistant plate 62 extending transversely with respect to the plate 62, and is arranged downstream of the first flow speed sensor A. One end of the flow resistant plate 62 is connected to the separation plate 61 and the other end is connected to the air duct 16. The flow resistance plate 62 has an opening 63 at a position downstream of the sensor A. The obstacle 60 reduces the speed of air flow at the region between the separation plate 61 and the air duct 16, after it has passed through one section of the dust filter 1. The drop in the speed is determined by the value of the projection of the resistant plate 62 to the dust filter 1 in comparison with the speed of the air flow passing through the remaining section of the dust filter 1 without an obstacle.

Figure 17:
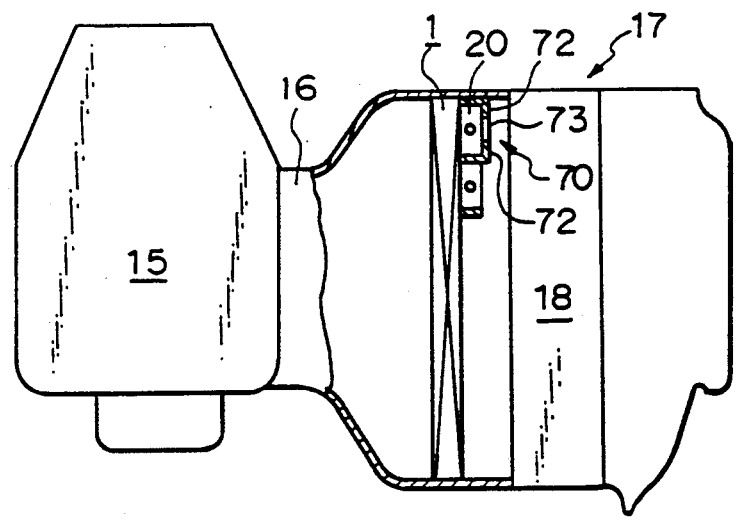
FIG. 17 is similar to FIG. 7, but shows another embodiment of the invention.
Figure 18:
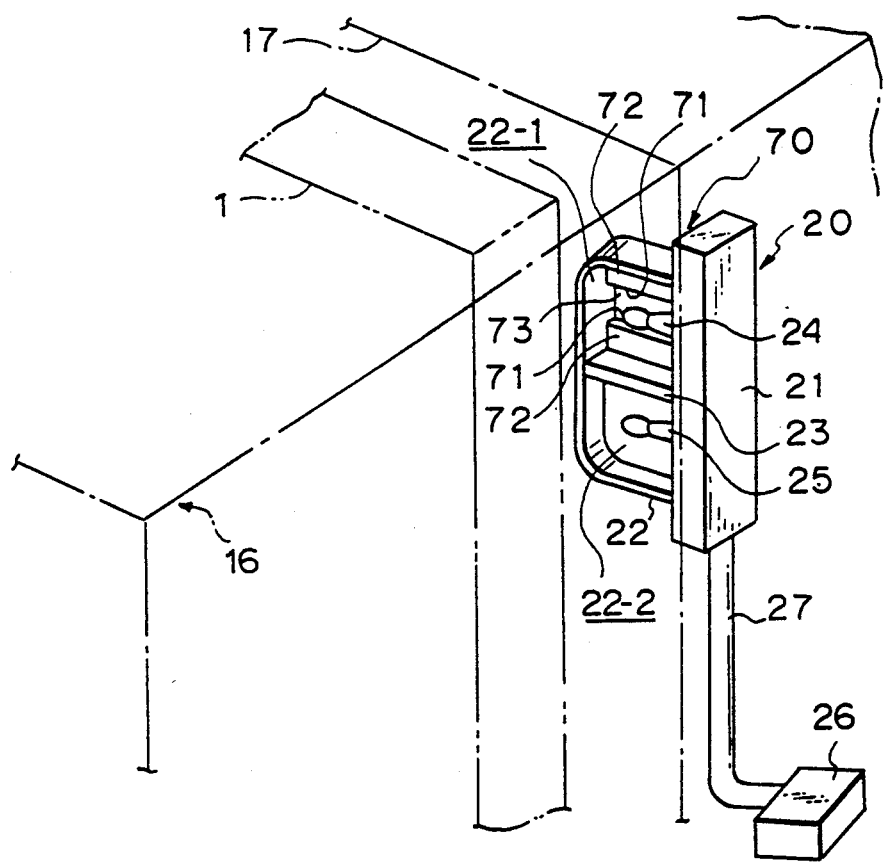
FIG. 18 is a partial perspective view of an obstacle and detecting unit shown in FIG. 17.

FIGS. 17 and 18 correspond to the embodiment shown in FIGS. 7 and 8, of the first group. An obstacle 70 of this embodiment is composed of a base plate 21, a flow shaping plate 22 in a U-shape having the ends thereof connected to the base plate 21, and a partition plate 23 arranged between the plates 22 and base plate 21 to provide sections 22-1 and 22-2 in which the flow speed sensors 24 and 25 are arranged respectively. The first sensor 24 is accommodated in one of the sections formed by the plates 21, 22 and 23. A pair of flow resistant plates are arranged vertically in the latter section and flush with the rear edge of the plates 21, 22 and 23, while facing each other, in the direction of the flow of air in the section. The flow resistant plates 72 form a pair of vertically spaced surfaces between which the sensor 24 is arranged. An opening 73 is formed between the facing surfaces of the flow resistant plates 72 at a position downstream of the sensor 24. According to this embodiment, the downstream end of the section 22-2 formed by the base plate 21, the flow shaping plate 22 and partition plate 23 in which the second sensor 25 is arranged is fully opened, and thus does not restrict the flow of air. Contrary to this, the downstream end of the section 22-1 formed by the base plate 21, the flow shaping plate 22 and partition plate 23 in which the first sensor 24 is arranged restricts the flow of air due to the pair of flow resistant plates 72 arranged so as to form restricted opening therebetween at a position downstream of the sensor 24. As a result, after passing through the downstream side of the dust filter 1, a difference in flow speed is created at the first section 22-1 and second section 22-2 when the air flows through the dust filter 1, which causes the flow amount at these sections 22-1 and 22-2, in which sensors 24 and 25 are arranged respectively, to be different. As a result, the embodiment in FIGS. 17 and 18 makes it possible to detect a degree of clogging of the dust filter 1 in the same way as in the embodiment shown in FIG. 1, to thereby provide a warning signal output by the comparator 6 and warning device 7 as shown in FIG. 2.

Figure 19:
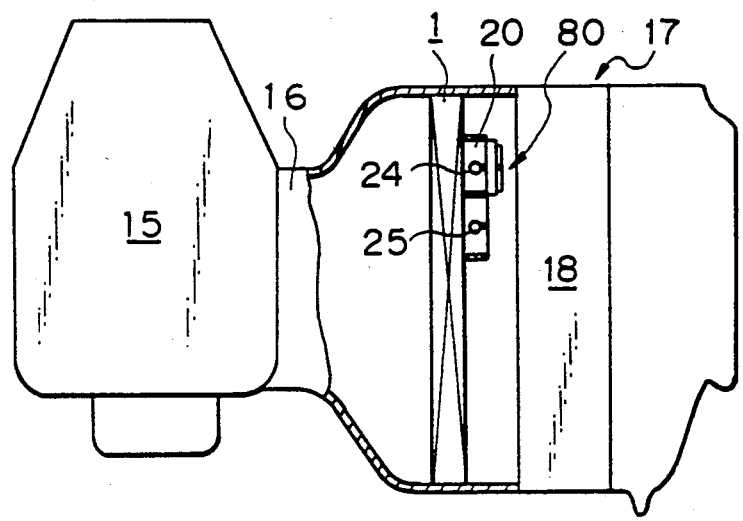
FIG. 19 is similar to FIG. 7, but shows another embodiment of the invention.

FIG. 19 shows an embodiment wherein an obstacle 80 is arranged downstream of a sensor 24 of the detecting unit 20 located downstream of the dust filter 20. The obstacle 80 has the same construction as shown in FIGS. 13 and 14, i.e., includes the flow resistant body 51, an opening 54 and a rotary plate 55. The detecting unit 20 has the same construction as that in FIG. 8, i.e., includes a base plate 21, a flow shaping plate 22 and partition plate 23, between which sections 22-1 and 22-2 are formed. The flow speed sensors 24 and 25 are arranged in the sections 22-1 and 22-2, respectively. Due to the arrangement of the obstacle 80 at a position downstream of the sensor 24 in the first section 22-1 of the unit 20, the flow of air passing through the sensor 24 is variably differentiated from that passing through the second section 22-2 in which the second sensor 25 is arranged. In this embodiment, a warning signal is also generated, and the rotary plate 55 is controlled so that a threshold value of the degree of clogging of the dust filter 1 for generating the warning signal can be changed separately for a detecting unit 20. In this embodiment, in place of the warning device 7, a control device for the blower can be used, whereby a rotational speed of the blower 15 can be controlled by the output signal from the control device.

In the above embodiment, the air flow speed sensors A and B are arranged downstream of the dust filter 1. As an alternative, the sensors A and B, together with the obstacle 80, can be arranged upstream of the dust filter 1. Where the air flow speed sensors A and B are arranged downstream of the dust filter 1 at at least two sections, respectively, a large thickness of the filter 1 may generate a phenomenon such that the direction of the air flow introduced into one section of the filter 1 having a larger flow resistance is changed toward the downstream side of the other section having a smaller flow resistance, which leads to a problem that the precision of the measurement by the air flow speed sensors A and B is poor. The arrangement of both sensors A and B at the upstream side of the dust filter 1 makes it possible to avoid the above-mentioned drawback.

Figure 20:
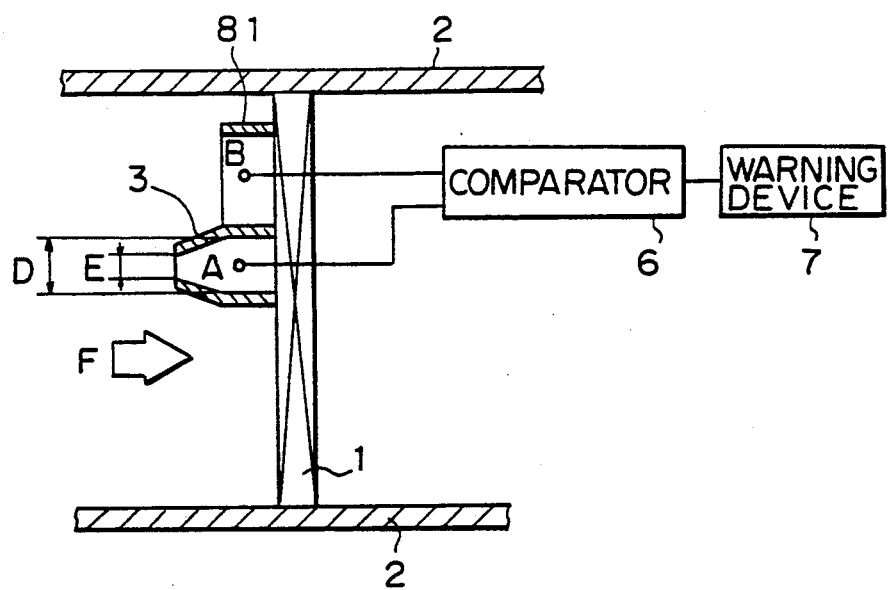
FIG. 20 is a view of another embodiment of the invention.

In FIG. 20, in an arrangement similar to that shown in the embodiment of FIG. 1, the air speed sensors A and B are arranged upstream of the dust filter at first and second sections thereof, respectively. A flow shaping plate 81 having the same diameter as that of the opening of large diameter D is arranged vertically adjacent to the obstacle 3 having the same construction as shown in FIG. 1, and in contact with the dust filter 1. The air flow speed sensors A and B are arranged inside the obstacle 3 and the flow shaping plate 81, respectively.

In the operation of the embodiment in FIG. 20, due to the small diameter at the inlet (first) end of the obstacle for introducing an air flow therein, the air flowing into the area of the dust filter facing the large diameter opening of the obstacle has a speed lower than that of the air flow flowing into a section of the dust filter facing the flow shaping plate 81 having a rectangular tubular shape. As a result, the amount of dust attached to the area of the dust filter 1 facing the obstacle 3 is smaller than the amount of dust attached to the area of the filter 1 facing the flow shaping plate 81. Therefore, the greater the clogging of the dust filter 1, the larger the drop in the speed of the air flow passing the area without an obstacle, which causes the speed to be lower than the speed of the air flow passing through the area of the dust filter facing the obstacle 3. It should be noted that these speeds are detected by the sensor A and B, respectively. As will be seen from the above description, the present invention makes it possible to compare the output levels from both of the air flow speed sensors A and B, at the comparator 6, and to issue a warning signal from the warning circuit when a predetermined threshold value of the degree of clogging at which the dust filter 1 should be replaced is obtained.

Figure 21:
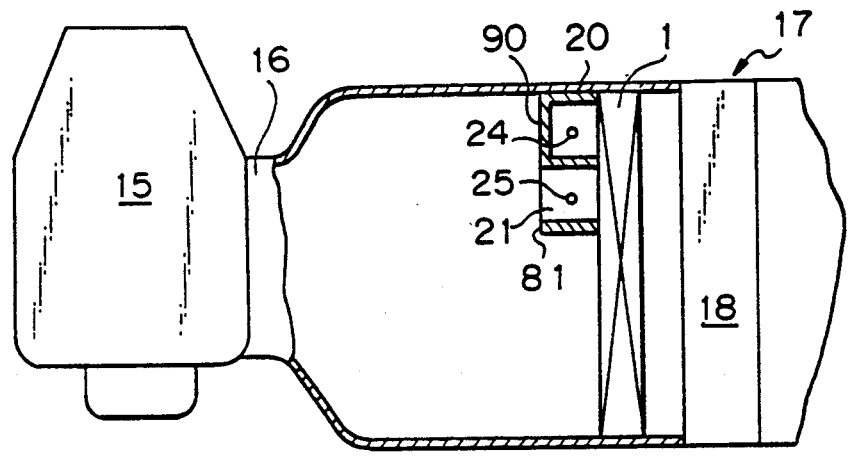
FIG. 21 is similar to FIG. 7, but shows another embodiment of the invention.
Figure 22:
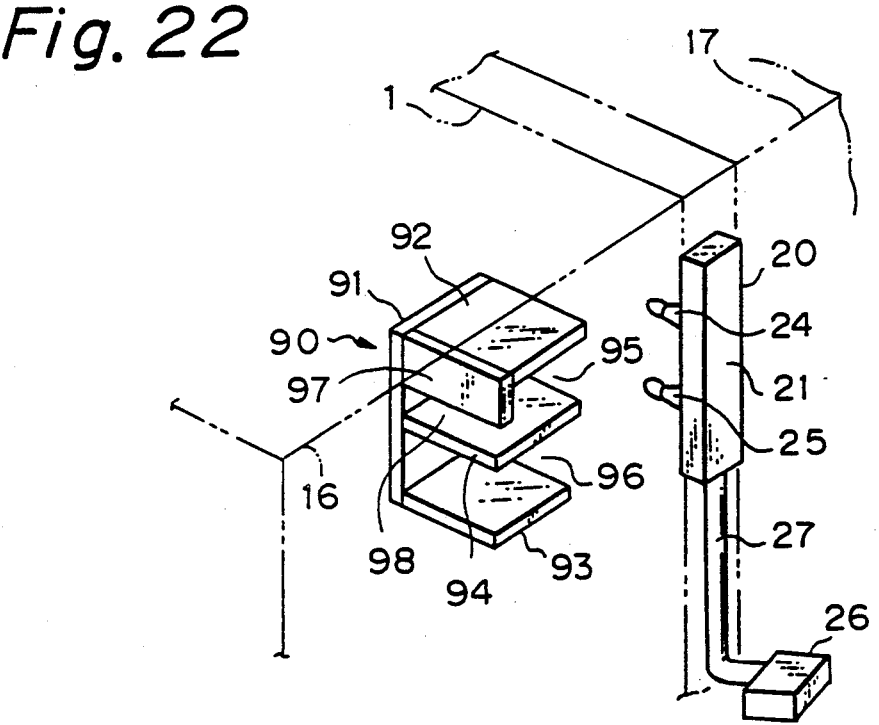
FIG. 22 is a partial perspective view of an obstacle and detecting unit shown in FIG. 21.

FIGS. 21 and 22 show a embodiment of the present invention, wherein the detection unit 20 in FIGS. 7 and 8 is located at a position upstream of the filter 1 but downstream of the obstacle 90. The detection unit 20 in this embodiment corresponds to that shown in FIG. 8 as shown in FIG. 22, except that the shaping plate 22 and partition plate 23 are omitted. The detection unit 20 is located between the filter 1 located at the downstream end of an air duct 16 arranged between the blower unit 15 and the cooler unit 17. The detection unit 20 is provided with a base plate 21 connected to the air duct 16 via a mounting hole (not shown) formed in an outer wall of the duct 16, and thus the flow speed sensors 24 and 25 are located upstream of the dust filter 1.

The obstacle 90 is shown separate from the detection unit 20 in FIG. 20, but in fact is integrally connected thereto. The obstacle 90 is provided with a vertical flow shaping plate 91 extending in parallel to the outer wall of the air duct, for attaching the base plate 21 of the detecting unit 20, and a pair of parallel horizontal flow shaping plates 92 and 93 extending transversely from opposite ends of the flow shaping plate 91 and extending transversely to the outer wall of the air duct 16 for mounting the base plate 21, and a partition plate 94 parallel to the plates 92, whereby a space is formed by the flow shaping plates 91 and 92 and the air duct 16 is divided into two sections 95 and 96 in which the sensors 24 and 25 are arranged, respectively. The free ends of the plates 92, 93 and 94 are fixed to the support plate 21. As will be easily seen, the flow shaping plates 91, 92 and 93 are parallel to the flow of air in the air duct 16, introduced to the dust filter 1, and downstream end surfaces of the flow shaping plates 91, 92 and 93 are in contact with the upstream end surface of the dust filter 1. A flow resistant plate 97 having a width smaller than the distance between the plates 92 and 93 is fixed to the plates 91 and 92, so that a restricted opening 98 is formed between the flow resistance plate 97 and the partition plate 94. As a result of the provision of the flow resistant plate 97, the amount of air flowing into the section 95 in which the first sensor 24 is located is smaller than that flowing into the section 96 in which the second sensor 25 is located. As a result, as described with reference to FIG. 20, a warning signal indicating a clogged state of the dust filter 1 can be obtained by comparing the detected values output by the air flow speed sensors 24 and 25.

Figure 23:
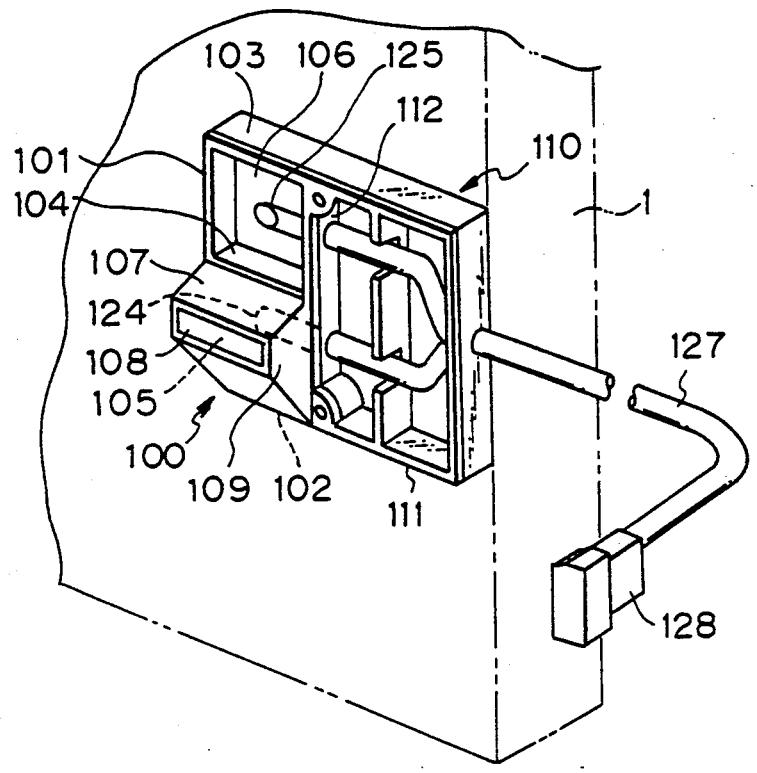
FIG. 23 shows an embodiment wherein an obstacle and a detecting unit are combined as one unit.

FIG. 23 shows another embodiment of the present invention wherein an obstacle 100 and a detecting unit 110 are combined to provide a single unit. In this embodiment, a rectangular base 111 is provided, having flow shaping plates 101, 102 and 103 and a separating plate 104 formed as one body by molding a synthetic resin. In addition, a base member 111 has a frame 112 which, together with the flow shaping plates 101, 102 and 103 and the partition plate 104, forms a pair of vertically spaced apart air flow spaces 105 and 106.

Flow speed sensors 124 and 125 are arranged in the spaces 105 and 106, respectively, and wires 127 extend from the sensors 124 and 125 to the warning unit 128, as in the embodiment shown in FIG. 8.

In this embodiment, the obstacle 100 and detection unit 110 as one unit are arranged upstream of the dust filter 1. The sides of the base 111 of the detection unit 110 and the obstacle 100 are in contact with the upstream side of the filter 1, and the flow shaping plates 101, 102 and 103 and the separation plate 104 are arranged in parallel with respect to the flow of the air in the air duct. The upstream ends of the flow shaping plates 101 and 102 and separation plate 104, which form the first space 105 of the obstacle 100, are fixed to a resistant member 109 having a truncated cone shape with an upstream opening 108 and a downstream opening wider than the upstream opening, so that the flow resistant member 109 is open to the first area in which the sensor 124 is arranged, at the wider, downstream opening thereof.

According to this embodiment, when the dust filter 1 is new, the flow speed of the air introduced into the flow area 106 without a resistant member is faster than the flow speed of the air introduced into the flow area 107 via the narrow upstream opening 108. The clogging of the filter section downstream of the flow area 106 without a flow resistant member proceeds faster than that of the filter section downstream of the flow area 107 with a flow resistant member 109, and therefore, after prolonged use, the speed of the air flow through the section of the dust filter downstream of the flow area 106 without a flow resistant member becomes lower than the speed of the air flow through the section of the dust filter downstream of the flow area 107 with the flow resistant member 109. The sensors 124 and 125 arranged in these flow areas 106 and 107 can detect these speeds, and the comparator compares the detected speeds and a warning signal is issued as explained with reference to FIG. 20.

Figure 24:
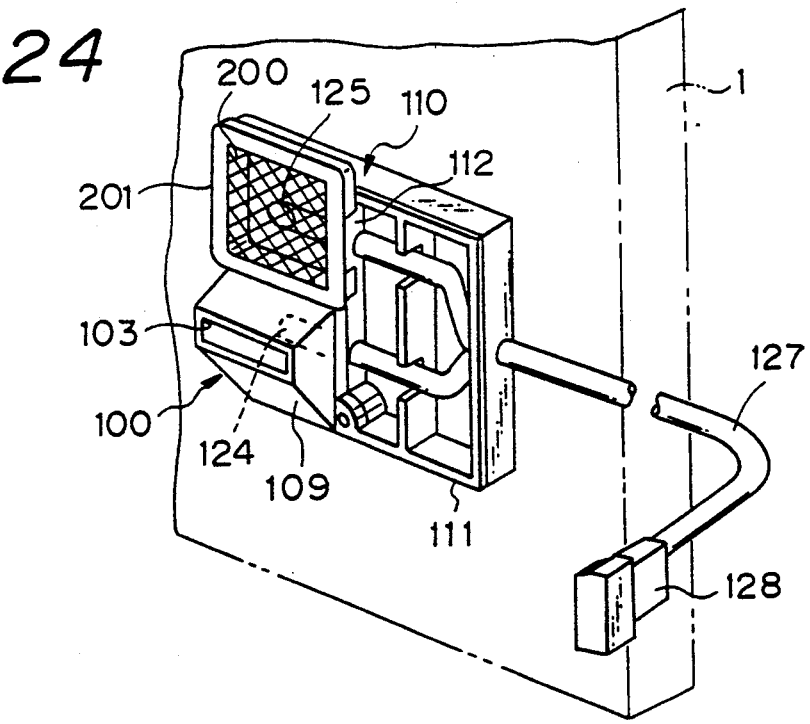
FIGS. 24 and 25 shown modifications, respectively, of the embodiment shown in FIG. 23.

FIG. 24 illustrates an embodiment which is a slight modification of the embodiment shown in FIG. 23. The embodiment in FIG. 24 includes an obstacle 100 and detection unit 110, which are combined and which are arranged so as not to be in contact with the filter 1, i.e., are suitably spaced therefrom. The base 111 is common to both the obstacle 100 and the detecting unit 110. The base 111 forms a frame 112, flow shaping plates 101, 102 and 103, and separation plate 104, which form the first flow area in which a first sensor 124 is arranged and a second flow area in which a second sensor 125 is arranged. The obstacle 100, as in the previous embodiment in FIG. 23, is arranged upstream of the flow area in which the sensor 124 is arranged. According to this embodiment, an auxiliary filter 200 is arranged upstream of the air flow section in which the second sensor 125 is arranged. A rectangular frame 201 is provided for mounting the filter, the frame 201 having the same rectangular shape as that of the flow shaping plates 101 and 103, the separation plate, and the frame 112. The auxiliary filter 200 is formed as a net which is less fine than the dust filter 1. A peripheral portion of the net-like auxiliary filter 200 is fixed to the rectangular frame 201, which is fixed to the upstream ends of the flow shaping plates 101 and 103, the separation plate 104, and the frame 112. The flow resistant element 109 of the obstacle 100, as in the embodiment of FIG. 23, is detachably arranged upstream of the flow area 105 formed by the flow shaping plates 101 and 102, the separation plate 104, and the frame 112.

In the embodiment of FIG. 24, the auxiliary filter 200 is arranged upstream of the flow space 106 in which the sensor 125 is arranged. Therefore, a comparison is made, at a location upstream of the dust filter 1, between the air speed of air passing through the auxiliary filter 200 and sensed by the sensor 125 and the speed of the air passing through the flow resistant member 109 upstream of the air space 105 and sensed by the sensor 124, and the air flow speed detected at the position downstream of the auxiliary filter 200 is used to determine the degree of clogging of the dust filter 1 located downstream of the auxiliary filter 200. From the relationship between the degree of clogging of the dust filter 1 and the auxiliary filter 200, a threshold level of the difference between the output values of the sensors 124 and 125 is determined, for an output of a warning that the dust filter is clogged.

Figure 25:
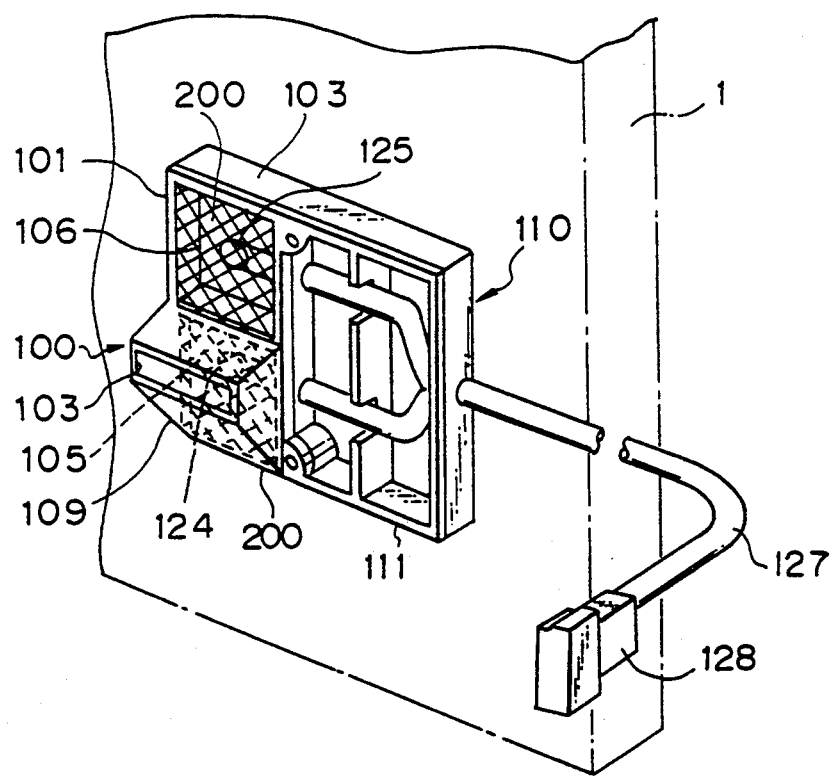

FIG. 25 shows another modification of the embodiment shown in FIG. 24. As in the embodiment of FIG. 24, the embodiment of FIG. 25 is provided with a connection between the obstacle 100 and the detecting unit 110 spaced from the upstream side of the dust filter 1. As in FIG. 23, a base 111 is common to the obstacle 100 and the detecting unit 100. The base 111 includes a flow shaping plate portions 101, 102 and 103, a partition plate portion 104, and a frame portion 112, which form a pair of vertically spaced flow areas 105 and 106 in which the sensor 124 and 125 are arranged, respectively. Mounted at upper edges of the plate portions 101, 102 and 103, the partition plate portion 104, and the frame portion 112 is an auxiliary filter 200 located arranged upstream not only of the flow area 106 in which the sensor 125 is arranged but also upstream of the flow area 105 in which the sensor 124 is arranged, by means of tapes having an adhesive layer on both sides or a separate frame member. A resistant body 109 is located upstream of the flow area 105. The auxiliary filter 200 has the same construction as that explained with reference to FIG. 24.

According to the embodiment shown in FIG. 25, the auxiliary filter 200 is arranged upstream of the flow areas 105 and 106 in which the flow speed sensors 124 and 125 are arranged, respectively. The sensors 124 and 125 detect a degree of clogging of the auxiliary filter 200 located upstream thereof, and the detected values are compared to determine the degree of clogging of the dust filter 1 arranged downstream of the auxiliary filter 200, based on the same principle as explained with reference to the embodiment of FIG. 1 and 2. Namely, a threshold value of a degree of clogging of the auxiliary filter at a position upstream of the sensor 125 is selected, for determining the timing of the replacement of the dust filter, from a known relationship between the characteristic of the clogging of the dust filter 1 and that of the auxiliary filter 200.

It should be noted that, throughout the embodiments as explained, only two flow sensors are used, but there is no intention of limiting the number of sensors and any suitable number thereof can be used to obtain a desired effect.

Although embodiments of the present invention described with reference to attached drawings, many modifications and changes can be made by those skilled in this art without departing from the scope and spirit of the present invention.

We claim:

1. A device for detecting a degree of clogging of a filter for capturing dust in a flow of air in an air passageway, due to an accumulation of dust in said filter, said device comprising:

at least one pair of sensors arranged in said air passageway at parts of the air flow corresponding to different sections of the dust filter, respectively, said sensors outputting electric signals indicating an air flow speed of the respective parts of the air flow;

means for generating a difference in a speed of an air flow introduced into the dust filter at said parts of the air flow;

a comparator for comparing levels of signals output from said sensors arranged at the respective parts of the air flow; and means for outputting a signal indicating that a predetermined degree of clogging has occurred in the dust filter when a predetermined relationship is established between the signals output from the sensors.

2. A device according to claim 1, wherein said means for generating a difference in a speed of an air flow introduced into the dust filter at said parts of the air flow comprise means for imparting a flow resistance to one of said parts of the air flow corresponding to one of the sections of the dust filter.

3. A device according to claim 2, further comprising means for adjusting a degree of air flow resistance for obtaining a desired characteristic of the clogging at the corresponding section of the filter.

4. A device according to claim 2, wherein said flow resistance imparting means comprise an obstacle located in one of the parts of the air flow directed to the corresponding section of the dust filter, for reducing the eamount of air flow, the obstacle being arranged on one side of the dust filter.

5. A device according to claim 4, wherein said obstacle has a passageway formed therein for said one of the parts of the air flow, ends of said passageway being aligned with the direction of flow of air, one of said ends facing the filter having a diameter larger than that of the other end, to thereby obtain a reduced amount of the flow of air passing through said passageway.

6. A device according to claim 4, wherein said obstacle is located at a position upstream of the filter, and the sensors are located at positions downstream of the filter.

7. A device according to claim 4, wherein said obstacle is located at a position downstream of the filter, and the sensors are located at positions between the filter and the obstacle.

8. A device according to claim 4, wherein said obstacle is located at a position upstream of the filter, and the sensors are located at positions between the obstacle and the filter.

9. A device according to claim 1, wherein said passageway has a portion for generating a bending of an air flow directed to the filter, said portion constructing said means for generating a difference in speeds of air flows introduced into the dust filter at said parts of said air flow.

10. A device according to claim 1, wherein a common casing means is provided for holding said means for generating a difference in speeds of the air flows, as well as sensors for detecting an air flow speed.

* * * * *